(12) United States Patent
Muñoz De La Torre Alonso et al.

(10) Patent No.: US 12,284,311 B2
(45) Date of Patent: Apr. 22, 2025

(54) METHODS OF AND DEVICES FOR IMPLEMENTING AND EXECUTING POLICY RULES ON A PER APPLICATION BASIS IN A TELECOMMUNICATIONS SYSTEM

(71) Applicant: Telefonaktiebolaget LM Ericsson (publ), Stockholm (SE)

(72) Inventors: Miguel Angel Muñoz De La Torre Alonso, Madrid (ES); Ruth Pallares Del Egido, Madrid (ES); Miguel Angel Puente Pestaña, Madrid (ES); Carlos Jimenez Cordon, Madrid (ES)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 148 days.

(21) Appl. No.: 18/321,868

(22) Filed: May 23, 2023

(65) Prior Publication Data
US 2023/0291841 A1    Sep. 14, 2023

Related U.S. Application Data

(62) Division of application No. 17/287,139, filed as application No. PCT/EP2018/083328 on Dec. 3, 2018, now Pat. No. 11,711,471.

(51) Int. Cl.
*H04M 15/00* (2024.01)
*H04L 12/14* (2006.01)

(52) U.S. Cl.
CPC ....... *H04M 15/66* (2013.01); *H04M 15/8016* (2013.01); *H04M 15/8228* (2013.01);
(Continued)

(58) Field of Classification Search
CPC ............. H04M 15/66; H04M 15/8016; H04M 15/8228; H04M 2215/7414;
(Continued)

(56) References Cited

U.S. PATENT DOCUMENTS

| | | | |
|---|---|---|---|
| 11,096,046 B2 * | 8/2021 | Li | H04W 4/50 |
| 2012/0081557 A1 * | 4/2012 | Kupinsky | H04W 4/24 |
| | | | 348/207.1 |

(Continued)

FOREIGN PATENT DOCUMENTS

| | | |
|---|---|---|
| WO | 2016186767 A1 | 11/2016 |
| WO | 2017189035 A1 | 11/2017 |
| WO | 2018127148 A1 | 7/2018 |

OTHER PUBLICATIONS

International Search Report and the Written Opinion of the International Searching Authority, issued in corresponding International Application No. PCT/EP2018/083328, dated Apr. 4, 2019, 12 pages.

(Continued)

*Primary Examiner* — Pakee Fang
(74) *Attorney, Agent, or Firm* — Rothwell, Figg, Ernst & Manbeck, P.C.

(57) ABSTRACT

Implementation of an application rule for an application to be accessed by a User Equipment, UE, in a user session in a Service Based Architecture, SBA, domain in a core network of a telecommunications system is disclosed. The SBA, among others, comprises a Policy Control Function, PCF (6), an Application Function, AF (5), and a Session Management Function, SMF (9). The method comprising the steps of receiving, by the PCF (6), an application rule comprising an AF Identifier, AF-ID, identifying the application rule, an Application Identifier, App-ID, identifying the application, and at least one service requirement for processing the application in the SBA domain. The PCF (6) instructing the SMF (9) to execute the at least one service requirement to all present and future user sessions pertaining to the respective application. Complementary methods of supporting the execution of the application rule and devices are also presented.

6 Claims, 4 Drawing Sheets

(52) U.S. Cl.
CPC . *H04L 12/1407* (2013.01); *H04M 2215/7414* (2013.01); *H04M 2215/7833* (2013.01)

(58) Field of Classification Search
CPC ....... H04M 2215/7833; H04L 12/1407; H04L 47/824; H04L 47/2483; H04L 41/5019; H04L 41/5029; H04L 47/2475; H04L 47/803; H04L 47/805; H04W 8/04; H04W 4/24
See application file for complete search history.

(56) References Cited

U.S. PATENT DOCUMENTS

| | | | |
|---|---|---|---|
| 2017/0188391 | A1 | 6/2017 | Rajagopal et al. |
| 2017/0317894 | A1* | 11/2017 | Dao ............... H04L 41/5009 |
| 2018/0192471 | A1 | 7/2018 | Li et al. |
| 2018/0242234 | A1 | 8/2018 | Semaan et al. |
| 2019/0007992 | A1* | 1/2019 | Kim .................. H04W 76/27 |
| 2021/0204103 | A1* | 7/2021 | Bartolomé Rodrígo ................. H04W 8/18 |

OTHER PUBLICATIONS

Ericsson "5G System details for PCC" SA WG2 Meeting #122, S2-174210, Jun. 26-30, 2017, San Jose Del Cabo, 273 pages.
3GPP "3rd Generation Partnership Project; Technical Specification Group Services and System Aspects; Procedures for the 5G System; Stage 2 (Release 15)" 3GPP TS 23.502 V15.2.0 (Jun. 2018), 308 pages.
International Preliminary Report on Patentability, issued in corresponding International Application No. PCT/EP2018/083328, dated Feb. 22, 2021, 21 pages.
ETSI TS 123 502 V15.2.0 (Jun. 2018) ETSI. 5G; Procedures for the 5G System (3GPP TS 23.502 version 15.2.0 Release 15) 5G Procedures for the 5G System, 3GPP TS 23.502 version 15.2.0, 311 pages.
Ericsson et al. "Solution to Key Issue" SA WG2 Meeting #127, Sanya, China, Apr. 16-20, 2018, S2-184010, 9 pages.
Ericsson "TS 23.501: Policy Framework" SA WG2 Meeting #122bis, Aug. 21-25, 2017, Sophia Antipolis, France, S2-175393, 50 pages.
Ericsson "5G System details for PCC" SA WG2 Meeting #122, Jun. 26-30, 2017, San Jose Del Cabo, S2-174210, 273 pages.
Samsung "Solution for K1#2: PC5 Rat Selection for a V2X application" SA WG2 Meeting #127bis, May 28-Jun. 1, 2018, Newport Beach, USA, S2-185851, 4 pages.
Intel Coporation "On RAT selection for NR V2X" 3GPP TSG-RAN WG2 Meeting 104, Spokane, Washington, USA, Nov. 12-16, 2018, R2-1816702 (Revision of R2-1814057), 6 pages.
Intel "PC5 Rat selection considering peer's PC5 Rat capability" 3GPP TSG SA WG2 Meeting #129, Oct. 15-19, 2018, Dongguan, China, S2-1810543, 4 pages.
Huawei, HiSilicon et al. "Path switch procedure between Uu and PC5" 3GPP TSG-RAN WG2 Meeting #98, Hangzhou, China, May 15-19, 2017, R2-1704715, 7 pages.
Huawei, HiSilicon et al. Summary of [93bis#24][LTEV2V] Tx PC5 and Uu path switch for V2V, 3GPP TSG-RAN WG2 Meeting #94, Nanjing, China, May 23-27, 2016, R2-163815, 25 pages.
Samsung "Mode 3 behaviour in shared resource pools for V2X phase 2" 3GPP TSG RAN WG2 Meeting #100, Reno, Nevada, USA, Nov. 27-Dec. 1, 2017, R2-1713749, 5 pages.

\* cited by examiner

METHODS OF AND DEVICES FOR IMPLEMENTING AND EXECUTING POLICY RULES ON A PER APPLICATION BASIS IN A TELECOMMUNICATIONS SYSTEM

CROSS REFERENCE TO RELATED APPLICATION(S)

This application is a divisional of U.S. patent application Ser. No. 17/287,139, filed Apr. 21, 2021, which is a 35 U.S.C. § 371 National Phase Entry Application from PCT/EP2018/083328, filed Dec. 3, 2018, designating the United States, and also claims the benefit of European Application No. 18382758.3, filed Oct. 25, 2018, the disclosures of which are incorporated herein by reference in their entirety.

TECHNICAL FIELD

The present disclosure generally relates to the field of telecommunications systems, and more specifically to the execution of policy rules relating to an application in a Service Based Architecture, SBA, domain in a core network of a telecommunications system, such as a Fifth Generation, 5G, telecommunication network.

BACKGROUND

The Fifth Generation, 5G, telecommunications core network architecture is an example of a Service Based Architecture, SBA, in which Network Functions, NF, provide one or multiple services to entities requiring telecommunications services from a particular NF. In turn, an NF may also request telecommunications services from another NF, for example. The NFs of the Core Network, CN, are self-contained functionalities that can be modified and updated in an isolated manner, i.e. without affecting other NFs.

The Application Function, AF, is an element offering applications that require policy and charging control of traffic plane resources, and interacts with the Third Generation Partnership Project, 3GPP, Core Network in order to provide, for example, services to support:
- application influence on traffic routing,
- interaction with the policy framework for policy control, and
- access of the Network Exposure Function, NEF.

Based on operator deployment, for example, AFs that are considered to be trusted may be allowed to interact directly with other relevant NFs, such as a Policy Control Function, PCF, a Session Management Function, SMF, and a User Plane Function, UPF. AFs that are not allowed by an operator to directly access other NFs shall use the external exposure framework, via the NEF, to interact with other relevant Network Functions.

The Policy Control Function, PCF, includes, among others, the following functionality:
- support for unified policy framework, to govern network behaviour,
- providing policy rules to Control Plane Function(s), CPFs, for enforcing thereof, and
- access of subscription information relevant for policy decisions in a Unified Data Repository, UDR.

The Session Management function, SMF, supports different functionality, such as session establishment, modification and release, and policy related functionalities like termination of interfaces towards policy control functions, charging data collection, support of charging interfaces and control and coordination of charging data collection at the UPF.

The User Plane function, UPF, supports handling of user plane traffic, including packet inspection, packet routing and packet forwarding, traffic usage reporting, and Quality of Service, QoS, handling for the user plane, such as Uplink/Downlink, UL/DL, rate enforcement, for example.

Unified Data Management, UDM, supports the Authentication Credential Repository and Processing Function, ARPF, and stores the long-term security credentials used in the Authentication and Key-Agreement, AKA, procedures in the 3GPP 5G Architecture.

The 5G system architecture allows the UDM, PCF and NEF to store data in the UDR, including subscription data and policy data, structured data for exposure and application data including Packet Flow Descriptions, PFDs, for application detection by the NEF.

Content providers may be interested in network services applying a specific data handling, such as a high QoS or charging treatment for their applications traffic, for example. To achieve this, content providers usually conclude a Service Level Agreement, SLA, with one or several network operators, relating to the level of service to be provided for a particular application.

The current 3GPP standards specify that policy and charging control has to be applied on a per user or per Protocol Data Unit, PDU, session basis. There is no mechanism in the policy and charging control framework which allows a content provider to request a certain QoS or charging treatment on a per application basis for all user sessions, for example for a social media type application or the like, having a relatively huge amount of subscribers.

The existing northbound Application Programming Interfaces, APIs, between the AF and the NEF allow the content provider to request a certain QoS, for example a high QoS, or special charging, such as sponsored data, for a certain application but only on a per individual user session basis. This holds, for example, for the northbound API for "Setting up an AS session with required QoS" or "Changing the chargeable party at session set up or during the session", currently defined in the 3GPP standards.

Accordingly, there is a need for implementing, in an SBA, service functionality relating to the processing of data and charging treatment for traffic on an application basis.

SUMMARY

In a first aspect of the present disclosure, there is presented a method of implementing an application rule for an application to be accessed by a User Equipment, UE, in a user session in a Service Based Architecture, SBA, domain in a core network of a telecommunications system, the SBA among others comprising a Policy Control Function, PCF, an Application Function, AF, a User Plane Function, UPF and a Session Management Function, SMF.

The method comprises the steps of: receiving, by the PCF, an application rule comprising an AF Identifier, AF-ID, identifying the respective application rule, an Application Identifier, App-ID, identifying the respective application, and at least one service requirement for servicing the respective application in the SBA domain, the application rule being different from existing Policy Charging and Control, PCC, rules and having higher precedence than existing per session PCC rules, and instructing, by the PCF, the SMF to execute the at least one service requirement to all present and future user sessions pertaining to the respective application.

In its first aspect, the present disclosure provides a special set of policy rules to be implemented in a PCF for handling data in an SBA telecommunications system on a per application basis. A respective policy or application rule is identified by its AF-ID, and the application to which an application rule pertains is identified by the App-ID, whereas the service or services to be provided are defined by the at least one service requirement.

In order to ensure uniform treatment or servicing of a particular application in the telecommunications system, the PCF is arranged to instruct the SMF to execute the at least one service requirement to all present and future user sessions pertaining to a respective application.

In a 5G SBA, for example, the PCF may install application rules in an SMF by means of triggering an Nsmf HTTP POST message to the SMF, including AF-ID, App-ID and a respective service requirement. Note these application rules are different to the existing Policy Charging and Control, PCC, rules as the application rules do not apply to a specific user session, but instead they apply to any existing or present and future user session.

Alternatively, the PCF could identify all the existing user sessions which would require a service modification and trigger PCC rule modification on a per user session basis, but this would result in a lot of messages which would significantly increase signalling in the network, in particular for applications that are used on a wide scale, such as social media type applications.

The solution according to the present disclosure enables flexible servicing of data exchanged in an SBA domain for one or several applications of a particular content provider or different content providers, simply by implementing a respective application rule in the PCF.

Although in a particular application rule all the service requirements may be specified that are available in an SBA domain for data or traffic handling on an individual user or session basis, in an example of the present disclosure, the application rule comprises at least one of a specific Quality of Service, QoS, handling for user sessions pertaining to the application to be accessed by the UE, and/or a specific charging profile for user sessions pertaining to the application to be accessed by the UE.

That is, data exchanged between a respective application of a content provider and all the UE in a system accessing a particular application for which an application rule is implemented and enforced, receive a required QoS specified in the respective application rule, for example better than a default QoS, and/or are charged against a particular agreed, for example reduced, tariff or fee.

It may be understood by the skilled person that when PCF instructs SMF to execute at least one service requirement to all existing and future user sessions using that application, the service requirement might be executed at SMF but in some cases it may be needed to be executed at UPF. For example, QoS Bandwidth limitation is a service requirement that SMF cannot perform itself, and hence the SMF may need to instruct UPF to do so through a new N4 procedure, per application. The step of instructing, therefore may additionally comprise the step of instructing, by the SMF, the UPF to execute the application rule provided to the SMF by the PCF.

According to an embodiment, wherein the SBA domain comprises a Unified Data Repository, UDR, the method further comprises the steps of: transmitting, by the PCF, a received application rule to the UDR, for storing in the UDR as application rule, in particular in association with a respective user session policy rule, and receiving, by the PCF, from the UDR, a message acknowledging the storage of the application rule.

An application rule may be stored in the UDR in association with existing policy rules relating to user sessions, i.e. Protocol Data Unit, PDU, sessions and respective application data. In the case of an application rule specifying a particular QoS and/or charging treatment other than specified for an individual or per user session, for example, this application rule is stored in association with the respective per user session QoS and/or charging policy rule. Those skilled in the art will appreciate that for a respective application several, different application rules may be stored.

For applying a particular application rule at initiation of a PDU session by a UE, a further embodiment of the present disclosure comprises the steps of: receiving, by the PCF, from the SMF, a request for retrieving at least one policy rule for the PDU session; retrieving, by the PCF, from the UDR, the or each stored policy rule including at least one application rule for the PDU session, and providing, by the PCF, the retrieved policy and application rules to the SMF.

It is assumed that application rules, if available, have a higher precedence than existing per user session or PDU session policy rules. However, in accordance with the present disclosure, a precedence parameter may be implemented in an application rule, for example, indicating a particular priority or preference level of the application rule over other policy rules pertaining to a user session.

According to an embodiment, the PCF may receive an application rule from an Application Function, AF, handling the application that requires a specific treatment. However, according to another exemplary embodiment, the PCF may also receive an application rule from a network operator.

In a second aspect of the present disclosure, there is presented a method of supporting the execution of an application rule for an application to be accessed by a User Equipment, UE, in a user session in a Service Based Architecture, SBA, domain in a core network of a telecommunications system, the SBA among other comprising a Policy Control Function, PCF, an Application Function, AF, a User Plane Function, and a Session Management Function, SMF.

The method according to the second aspect comprises the steps of: receiving, by the SMF, an instruction from the PCF, instructing the SMF to execute a desired application rule to all present and future user sessions pertaining to the application, the desired application rule being different from existing Policy Charging and Control, PCC, rules and having higher precedence than existing per session PCC rules; identifying, by the SMF, user sessions to which the desired application rule is applicable, and executing, by the SMF, the desired application rule to the identified user sessions.

The SMF identifies the active user sessions which require a service modification, such as a QoS modification and/or a new charging handling, and applies the new service requirement or requirements for each of the respective sessions. The SMF may respond back to the PCF, for example with an Nsmf 200 OK successful response in the case of a 5G SBA.

According to an embodiment, the received instruction comprises an AF Identifier, AF-ID, an Application Identifier, App-ID, and at least one service requirement for processing the application in the SBA domain, wherein the identified user sessions are identified on the basis of the AF-ID and the App-ID.

In a third aspect of the present disclosure, there is presented a method of supporting the execution of an application to be accessed by a User Equipment, UE, in a user session in a Service Based Architecture, SBA, domain in a core network of a telecommunications system, the SBA among others comprising a Policy Control Function, PCF, an Application Function, AF, and a Unified Data Repository, UDR.

The method according to the third aspect comprises the steps of receiving, by the UDR, from the PCF, an application rule applicable to an application to be accessed by the UE, the received application rule being different from existing Policy Charging and Control, PCC, rules and having higher precedence than existing per session PCC rules, storing, by the UDR, the received application rule, receiving, by the UDR, from the PCF, a request for an application rule applicable to a user session, the request identifying an application to be accessed by the UE, and transmitting, by the UDR, to the PCF, the requested application rule stored in the UDR.

In the case of a 5G based SBA domain, for example, for new user PDU sessions, the UE triggers PDU session establishment by means of sending a PDU Session Establishment Request to an Access and Mobility Management Function, AMF, of the SBA domain. The AMF selects an SMF and triggers Nsmf PDU Session Create. Subsequently, the SMF triggers an Npcf_SMPolicyControl_Create Request message to retrieve Session Management, SM, policies for the user PDU session. The PCF triggers an Nudr_DM_Query Request message to retrieve the policy data for this user PDU session. The UDR will answer with an Nudr_DM_Query Response message including the Subscriber Policy Data. The UDR may also return the application data including the AF-ID, App-ID, and service requirement(s) such as QoS-reference, for example indicating better than default QoS, and charging Profile, for example sponsored data, whereby the application traffic is not charged to the end user but to the content provider instead.

In a fourth aspect of the present disclosure, there is presented a Policy Control Function, PCF, in a Service Based Architecture, SBA, domain in a core network of a telecommunications system, the SBA further comprising, among others, an Application Function, AF and a Session Management Function, SMF, the PCF being arranged to implement an application to be accessed by a User Equipment, UE, in a user session in the SBA domain.

The PCF comprising receive equipment arranged for receiving an application rule comprising an AF Identifier, AF-ID, identifying the respective application rule, an Application Identifier, App-ID, identifying the application, and at least one service requirement for processing the application in the SBA domain, the application rule being different from existing Policy Charging and Control, PCC, rules and having higher precedence than existing per session PCC rules, and instruct equipment arranged for instructing the SMF, to execute the at least one service requirement to all present and future user sessions pertaining to the application.

According to an embodiment, the SBA domain comprises a Unified Data Repository, UDR, the PCF further comprises transmit equipment arranged for transmitting a received application rule to the UDR, for storing in the UDR, and wherein the receive equipment is further arranged for receiving, from the UDR, a message acknowledging the storage of the application data.

In an embodiment, the receive equipment is further arranged for receiving, from the SMF, a request to retrieve application rules for a Protocol Data Unit, PDU, session, and the PCF further comprises retrieve equipment arranged for retrieving, from the UDR, stored application rules and application data for the PDU session, and provide equipment arranged for providing the retrieved application rules to the SMF.

In a fifth aspect of the present disclosure, there is presented a Session Management Function, SMF, in a Service Based Architecture, SBA, domain in a core network of a telecommunications system, the SBA further comprising, among others, an Application Function, AF, a User Plane Function, UPF and a Policy Control Function, PCF, the SMF being arranged to support the implementation of an application to be accessed by a User Equipment, UE, in a user session in the SBA domain.

The SMF comprises receive equipment arranged for receiving an instruction from the PCF, instructing the SMF to execute a desired application rule to all present and future user sessions pertaining to the application, the desired application rule being different from existing Policy Charging and Control, PCC, rules and having higher precedence than existing per session PCC rules, identification equipment arranged for identifying user sessions to which the desired application rule is applicable, and implement equipment arranged for implementing the desired application rule to the identified user sessions.

It may be understood by the skilled person that when the PCF instructs SMF to execute at least one service requirement to all existing and future user sessions using that application, the service requirement might be executed at SMF but in some cases it may be needed to be executed at UPF. For example, QoS Bandwidth limitation is a service requirement that SMF cannot perform itself, and hence the SMF may need to instruct UPF to do so through a new N4 procedure, per application. Therefore, in such situations, where the application rule is directly not executable at the SMF, but rather at the UPF or any other node, the implement equipment may further be arranged to transmit said application rule to the UPF or any other node in order to implement the application rule.

In a sixth aspect of the present disclosure, there is presented a Unified Data Repository, UDR, in a Service Based Architecture, SBA, domain in a core network of a telecommunications system, the SBA further comprising, among others, a Policy Control Function, PCF, an Application Function, AF and a Session Management Function, SMF, the UDR being arranged to support the implementation of an application rule for an application to be accessed by a User Equipment, UE, in the telecommunications system.

The UDR comprising receive equipment arranged for receiving, from the PCF, an application rule applicable to an application to be accessed by the UE, the application rule being different from existing Policy Charging and Control, PCC, rules and having higher precedence than existing per session PCC rules, storage equipment arranged for storing the received application rule. The receive equipment being further arranged for receiving, from the PCF, a request for an application rule applicable to a user session, the request identifying an application to be accessed by the UE, and transmit equipment arranged for transmitting, to the PCF, the requested application rule stored in the storage equipment of the UDR.

In a seventh aspect of the present disclosure, a computer program product is provided, comprising a computer readable storage medium, storing instructions which, when executed on at least one processor operative in an SBA domain, cause the at least one processor to carry out processing steps for performing the services according to a respective one of the first, second and third aspect of the present disclosure.

It will be appreciated that the entities and modules disclosed may be implemented as separate hardware and/or software modules and entities, and controlled by or executed in a processor or the like.

The above mentioned and other features and advantages of the disclosure will be best understood from the following description referring to the attached drawings. In the drawings, like reference numerals denote identical parts or parts performing an identical or comparable function or operation.

DETAILED DESCRIPTION

Embodiments contemplated by the present disclosure will now be described more in detail with reference to the accompanying drawings. Other embodiments, however, are contained within the scope of the subject matter disclosed herein. The disclosed subject matter should not be construed as limited to only the embodiments set forth herein. Rather, the illustrated embodiments are provided by way of example to convey the scope of the subject matter to those skilled in the art.

Figure 1:
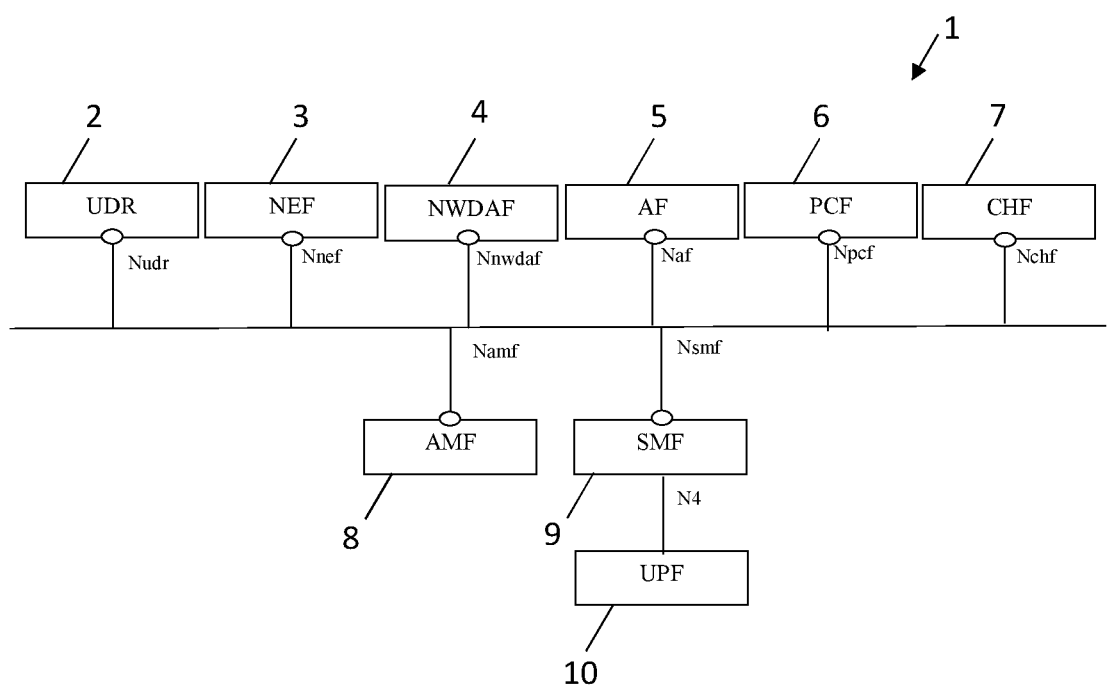
FIG. 1 schematically illustrates a part of a reference architecture of a Fifth generation, 5G, telecommunication systems according to the prior art.

FIG. 1 schematically illustrates part of a known reference architecture 1 of a fifth generation, 5G, Service Based Architecture, SBA, telecommunication network. The 5G system architecture comprise the following Network Functions, NFs:

Access and Mobility Management Function, AMF, 8
Network Exposure Function, NEF, 3
Policy Control Function, PCF, 6
Session Management Function, SMF, 9
Unified Data Repository, UDR, 2
User Plane Function, UPF, 10
Application Function, AF, 5
Network Data Analytics Function, NWDAF, 4
Charging Function, CHF, 7.

A functional description of these network functions is specified in clause 6 of the Third Generation Partnership Project, 3GPP, standard 23.501, "System Architecture for the 5G system", the contents of which are included herein by reference.

The proposed solution allows a content provider (or network operator) to execute a specific service requirement or service requirements, such as a particular Quality of Service, QoS, and/or charging handling, for example, on a per application basis by implementing and executing an application rule.

Figure 2:
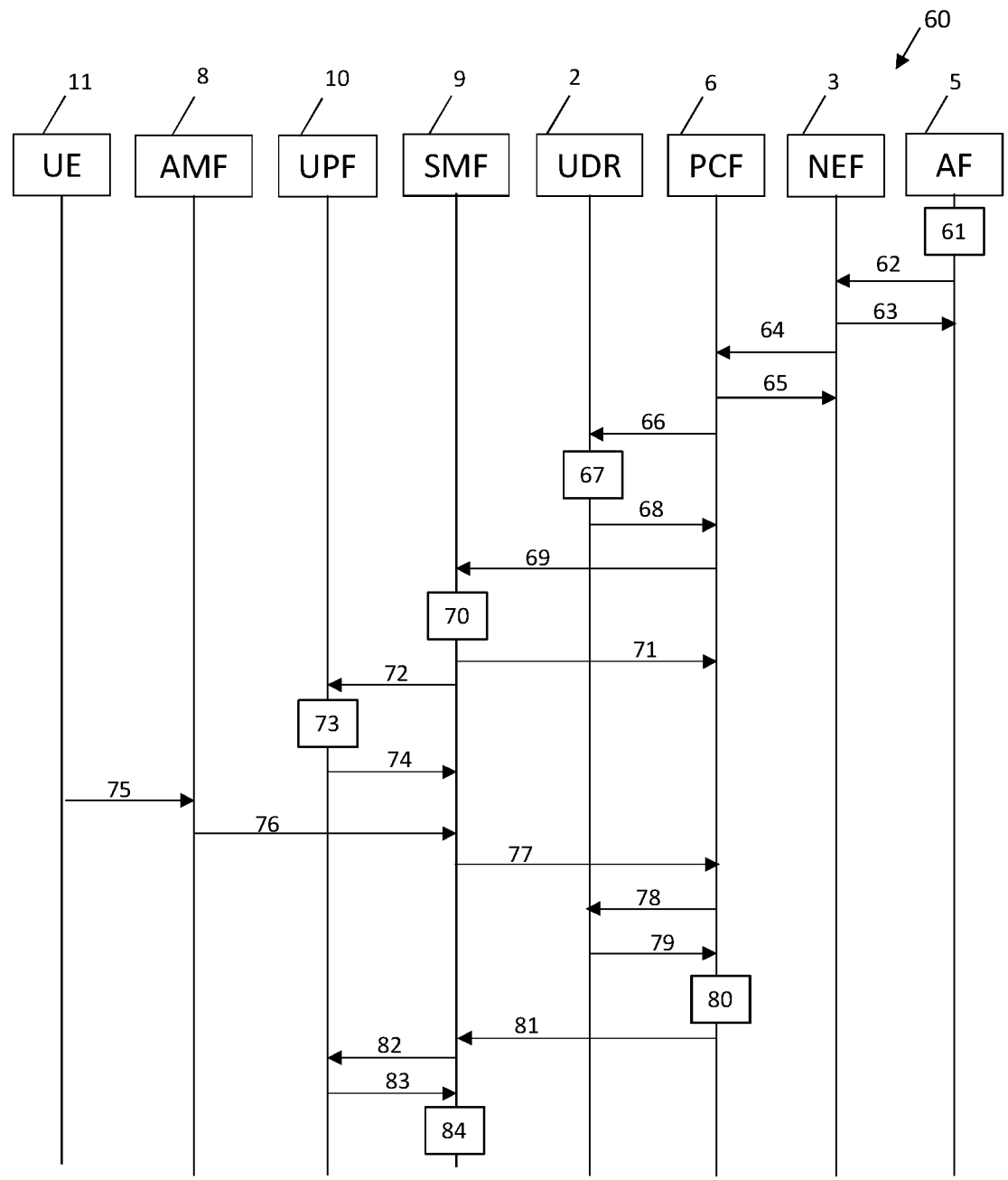
FIG. 2 schematically illustrates a method according to the present disclosure.

The sequence diagram shown in FIG. 2 illustrates the case where a content provider, for example a social media application content provider, requests to apply a better than default QoS for data exchanged in the SBA telecommunications system and/or a specific charging handling to data exchanged with the respective social media application.

In a first step, the content provider applies 61 for a better than default QoS and/or a certain charging handling for the target application, by triggering a new procedure in the Northbound Application Programming Interface, API, towards the network operator's NEF 3. It is proposed to define a new API—"Procedure for AF 5, to request a specific QoS and/or charging handling for an application" in the Third Generation Partnership Project, 3GPP, Technical Specification, TS, 29.522 as described below.

The content provider, through AF 5, sends 62 an HTTP POST message to the NEF 3. The body of HTTP POST message shall include an AF Identifier, AF-ID, identifying the application rule, an external App-ID, identifying the particular application, in this example a social media application, a QoS-reference, indicating a better than default QoS, and a charging profile, such as sponsored data, whereby the application traffic is not charged to the end user but to the content provider instead. The skilled person appreciates that the cited services are merely exemplary and may be modified suitably to suit the needs of the consumer.

After receiving the message in Step 62, the NEF 3 shall authorize the request, map the external App-ID to an (internal) App-ID and respond back 63 to AF 5 with a Nnef 200 OK successful response in this case. The NEF 3 shall interact 64 with the PCF through Npcf by sending the parameters indicated above, namely AF-ID, App-ID, QoS-reference, charging profile. In FIG. 2, for simplicity, a single PCF 6 instance is shown, but NEF 3 would need to trigger the procedure towards any PCF 6 instance in operator's network.

After receiving the message in step 64, PCF 6 shall respond back 65 to NEF 3 with an Npcf 200 OK successful response and transmits 66 the parameters of the application rule to the UDR 2 in order to store 67 the application rule in the UDR 2 as "Application Data", i.e. the parameters mentioned above AF-ID, App-ID, QoS-Reference and charging profile. As part of the Fifth generation, 5G, data storage architecture, UDR 2 stores as "Application Data" the Packet Flow Descriptions, PFDs. In the present disclosure it is proposed to extend the "Application Data" to include service requirements, such as QoS and charging information on a per application basis. After storing 67 the "Application Data", the UDR 2 shall respond back 68 to PCF 6 with an Nudr 200 OK successful response.

The PCF 6 shall install application rules by means of triggering an Nsmf HTTP POST message 69 to the SMF 9 including, in the present example, AF-ID, App-ID, QoS-Reference and charging Profile. It may be noted that these application rules are different to the existing Policy Charging and Control, PCC, rules as the application rules do not apply to a specific user session, but instead they apply to any existing (and future) user session. Additionally, a precedence parameter may be conveyed in the application rule, but in the present disclosure for simplicity we will assume the application rules have higher precedence than the existing per user session PCC rules.

Alternatively, PCF 6 could identify all the existing user sessions which would require QoS modification and/or a different charging handling and trigger a PCC rule modification on a per user session basis, but this would result in a lot of messages to be exchanged in the telecommunications system, which would increase signalling. In FIG. 2, for simplicity, a single SMF instance 9 is shown, but the PCF 6 would need to trigger the procedure towards any SMF instance 9 in operator's network.

In a further step, SMF 9 identifies 70 the active user sessions which require QoS modification and/or a new charging handling and applies the new QoS and/or charging handling for each of them. Due to the Control and User Plane Separation, CUPS, feature, the Policy and Charging Enforcement Function, PCEF, QoS and charging functionality is split into control plane and user plane. This means that in this step 70, SMF 9 would need to apply only the control plane part of the QoS and/or charging. Two examples:

- If the "application rule" consists of App-ID=social media application and QoS-Reference=bandwidth limitation to x kbps, this should be enforced by UPF 10, not impacting SMF 9.
- If the "application rule" consists of App-ID=social media application and charging profile=sponsored data, this should be enforced by both SMF 9 and UPF 10, as follows:
- SMF 9 would need to trigger a Call Detail Record, CDR, assuming offline charging for the social media application indicating that the charged entity is not the end user, but the content provider itself.
- UPF 10 would need to be instructed to report the volume for the social media application.

In the step 71, the SMF 9 shall respond back to PCF 6 with an Nsmf 200 OK successful response. The SMF 9 shall trigger 72 a (new) per node Packet Forwarding Control Protocol, PFCP, procedure, for example a PFCP Application Rule Request, to indicate to the UPF 10 the requested QoS and/or charging handling for the application. These application rules are different to the existing PFCP rules which are based on Packet Detection Rule, PDR (PDI=App-ID), QoS Enforcement Rule, QER, and Usage Reporting Rule, URR, as they do not apply to a specific user session, but instead they apply to any existing (and future) user session. Additionally, a precedence parameter may be conveyed, but in the present disclosure for simplicity it is assumed that the application rules have higher precedence than the existing per user session PFCP rules.

In FIG. 2, for simplicity, a single UPF 10 is shown, but SMF 9 would need to trigger the procedure towards any UPF 10 handled by the SMF 9. The UPF 10 identifies 73 the active user sessions which require QoS modification and/or a new charging handling and applies the new QoS and/or charging handling for each of them. As mentioned in Step 70 above, due to the CUPS feature, the PCEF QoS and charging functionality is split into control plane and user plane. This means that in this step 73, UPF 10 would need to apply only the user plane part of the QoS and/or charging. UPF 10 shall respond back 74 to SMF 9 with a PFCP Application Rule Response.

Steps 61-74 describe the mechanism to be applied to any existing user PDU sessions. The steps 75-84 define the mechanism to be applied for new or future user PDU sessions, for executing a particular application rule in accordance with the present disclosure.

User equipment, UE 11 triggers 75 a PDU session establishment, by means of sending a PDU Session Establishment Request to AMF 8. AMF 8 selects SMF 9 and triggers 76 Nsmf PDU Session Create. It may be noted that the sequence diagram in FIG. 2 does not include all the signalling messages involved in the PDU Session Establishment procedure. These steps are known to the person skilled in the art. Only the relevant signalling messages for the present disclosure are described in subsequent steps.

In a step 77, the SMF 9 triggers an Npcf_SMPolicyControl_Create Request message to retrieve Session Management, SM, policies for the user PDU session. The PCF 6 triggers 78 Nudr_DM_Query Request message to retrieve the policy data for this user PDU session. The UDR 2 answers 79 with Nudr_DM_Query Response message including the Subscriber Policy Data. As part of the present disclosure, UDR 2 will also return the Application Data including the AF-ID, App-ID, QoS-Reference, for example indicating a better than default QoS, and charging profile such as sponsored data.

The PCF 6 generates 80 the corresponding PCC rules based on both Subscriber Policy Data and Application Data. As mentioned, the precedence parameter, if used, may determine which rules have to be applied in case of conflict (i.e. either the ones in Subscriber Policy Data or the ones in Application Data), but in the example sequence diagram of FIG. 2, for simplicity, it is assumed that the Application Data rules have higher precedence than the existing Subscriber Policy Data rules.

Based on the above generated PCC rules in step 80, the PCF 6 triggers 81 Npcf_SMPolicyControl_Create Request message including the PCC rules to be applied for this user PDU session. In this case, there will be a PCC rule for the social media application with a QoS-Reference (e.g. indicating better than default QoS) and with a charging profile (e.g. including the sponsor identity to indicate that this is sponsored data).

In a further step 82, SMF 9 selects UPF 10 and triggers a PFCP Session Establishment Request message including the corresponding PDRs/FARs/QERs/URRs. In this case, there will be a PDR with PDI of type application with App-ID=social media application, a QER including the QoS-Reference, and a URR for reporting according to the charging profile, which indicates that the social media application should run with a better than default QoS and report according to the conditions in the charging profile.

UPF 10 stores the PDRs/FARs/QERs/URRs and answers back 83 to SMF 9 with a PFCP Session Establishment Response message. When a user opens the respective social media application, UPF 10 detects social media application traffic by matching the incoming packets with the PDR with PDI of type application with App-ID=social media application, applies 84 the QoS in the QER mapped to this PDR, resulting in social media application traffic having better QoS than default user traffic. It will also report based on the URR according to the charging profile.

Finally, it may be understood that the solution described in the present disclosure does not only apply to 5G network architecture, but the same mechanisms may also be applied to Fourth Generation, 4G, telecommunication network just by replacing:

- NEF 3 by Service Capability Exposure Function, SCEF,
- AF 5 by Services Capability Server/Application Server SCS/AS,
- PCF 6 by Policy and Charging Rules Function, PCRF,
- SMF 9 by PDN Gateway Control Plane Function, PGW-C, or Traffic Detection Function-Control plane Function, TDF-C,
- UPF 10 by PDN Gateway User Plane Function, PGW-U, or Traffic Detection Function-User plane Function TDF-U.

Figure 3:
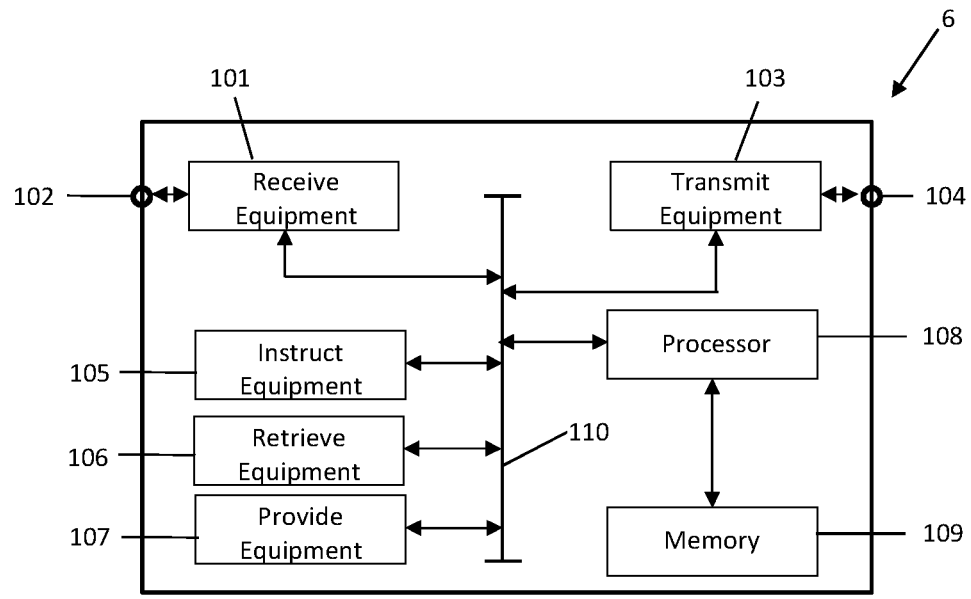
FIG. 3 schematically illustrates a Policy Control Function, PCF, node according to the present disclosure.

FIG. 3 schematically illustrates a Policy Control Function, PCF, 6 node according to the present disclosure. The receive equipment 101, 102 is arranged for receiving an application rule comprising an AF Identifier, AF-ID, identifying the respective application rule, an Application Identifier, App-ID, identifying the application, and at least one service requirement for processing the application in the SBA domain. The instruct equipment 105 is arranged for instructing the SMF 9 to execute the at least one service requirement to all present and future user sessions pertaining to the respective application. Such an instruction may be transmitted to the SMF via the transmit equipment 103, 104.

The transmit equipment 103, 104 may further be arranged for transmitting the received application rule to the UDR 2, for storing in the UDR 2 as application data. Furthermore, the receive equipment 101, 102 is further arranged for receiving, from the UDR, a message acknowledging the storage of the application data.

The receive equipment 101, 102 may further be arranged for receiving, from the SMF 9, a request to retrieve application rules for a Protocol Data Unit, PDU, session, and the PCF 6 further comprises retrieve equipment 106 arranged for retrieving, from the UDR 2, stored application rules and application data for the PDU session, and comprises provide equipment 107 arranged for providing the retrieved application rules to the SMF 9. The PCF 6 further comprises a processor 108 that is arranged for executing computer readable instructions stored in the memory 109. The internal modules communicate with one another via a communication bus 110.

Figure 4:
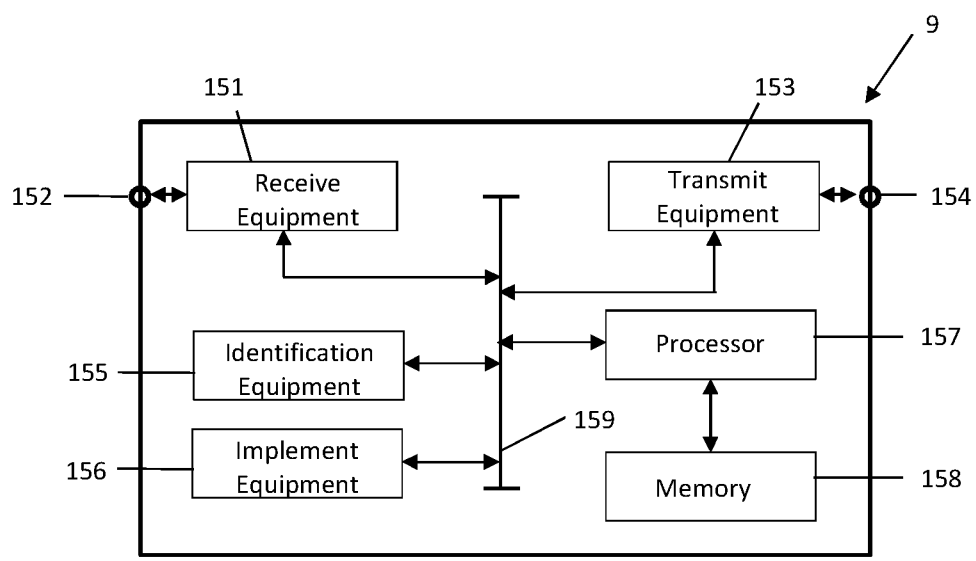
FIG. 4 schematically illustrates a Session Management Function, SMF, node according to the present disclosure.

FIG. 4 schematically illustrates a Session Management Function, SMF, 9 node according to the present disclosure. The SMF 9 comprises receive equipment 151, 152 arranged for receiving an instruction from the PCF 6, instructing to execute a desired application rule to all present and future user sessions pertaining to a respective application. The SMF 9 also comprises identification equipment 155 arranged for identifying user sessions to which the desired application rule is applicable.

The SMF 9 further comprises implement equipment 156 arranged for implementing the desired application rule to the identified user sessions. The SMF node 9 may also communicate with other nodes in the SBA domain using the receive equipment 151, 152 and the transmit equipment 153, 154. The SMF 9 comprises a processor 157 that is arranged for executing computer readable instructions stored in the memory 158. The internal modules communicate with one another via a communication bus 159.

Figure 5:
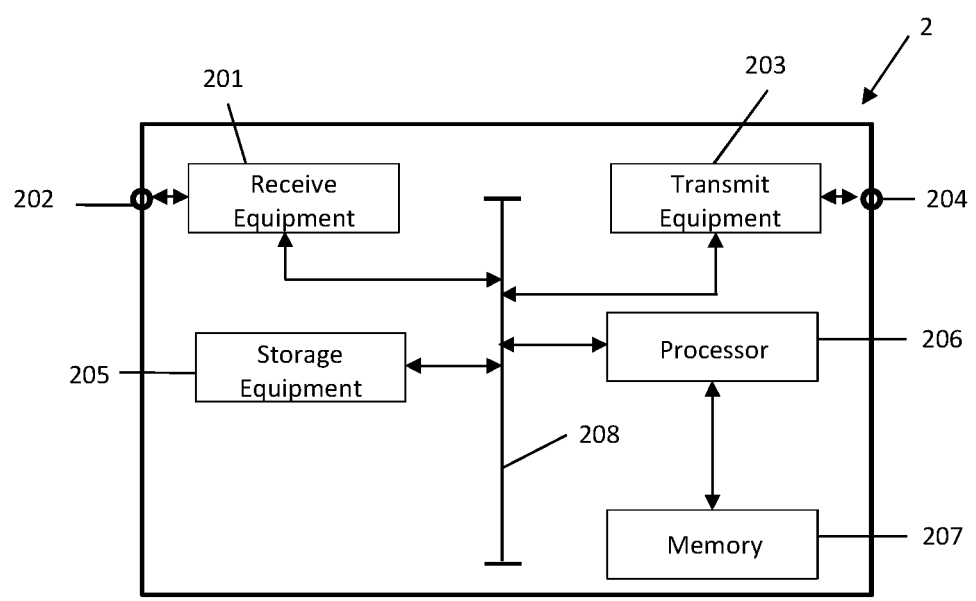
FIG. 5 schematically illustrates a Unified Data Repository, UDR, according to the present disclosure.

FIG. 5 schematically illustrates a Unified Data Repository, UDR, 2 according to the present disclosure. The UDR 2 comprises receive equipment 201, 202 arranged for receiving, from the PCF 6, an application rule applicable to an application to be accessed by the UE. The UDR 2 further comprises storage equipment 205 arranged for storing, the received application rule.

The receive equipment 201, 202 is further arranged for receiving, from the PCF 6, a request for an application rule applicable to a user session, the request identifying an application to be accessed by the UE, and transmit equipment 203, 204 arranged for transmitting, to the PCF, the requested application rule stored in the storage equipment 205 of the UDR 2. The UDR 2 further comprises a processor 206 that is arranged for executing computer readable instructions stored in the memory 207. The internal modules communicate with one another via a communication bus 208.

Other variations to the disclosed examples can be understood and effected by those skilled in the art in practicing the present disclosure, form a study of the drawings, the disclosure and the appended claims. In the claims, the word "comprising" does not exclude other elements or steps and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium supplied together with or as part of other hardware, but may also be distributed in other forms, such as via the internet or other wired or wireless telecommunication systems. Any reference signs in the claims should not be construed as limiting the scope thereof. Similar reference signs denote similar or equivalent functionality.

The present disclosure is not limited to the examples as disclosed above, and can be modified and enhanced by those skilled in the art beyond the scope of the present disclosure as disclosed in the appended claims without having to apply inventive skills and for use in any data communication, data exchange and data processing environment, for example for operational message handling between an SBA domain and fixed network access and Long Term Evolution, LTE, network access.

The invention claimed is:

1. A method of supporting execution of an application rule for an application to be accessed by a User Equipment, UE, in a user session in a Service Based Architecture, SBA, domain in a core network of a telecommunications system, said SBA at least comprising a Policy Control Function, PCF, an Application Function, AF, a User Plane Function, UPF and a Session Management Function, SMF, said method comprising the steps of:

receiving, by said SMF, an instruction from said PCF, instructing said SMF to execute a desired application rule to all present and future user sessions pertaining to said application, said desired application rule being different from existing Policy Charging and Control, PCC, rules and having higher precedence than existing per session PCC rules;

identifying, by said SMF, user sessions pertaining to said application to which said desired application rule is applicable, and executing, by said SMF, said desired application rule to said identified user sessions pertaining to said application.

2. The method according to claim 1, wherein said instruction comprises an AF Identifier, AF-ID an Application Identifier, App-ID, and at least one service requirement for processing said application in said SBA domain, wherein said identified user sessions are identified on the basis of said AF-ID and said App-ID.

3. A method of supporting execution of an application rule for an application to be accessed by a User Equipment, UE, in a user session in a Service Based Architecture, SBA, domain in a core network of a telecommunications system, said SBA at least comprising a Policy Control Function, PCF, an Application Function, AF, and a Unified Data Repository, UDR, said method comprising the steps of:

receiving, by said UDR, from said PCF, an application rule applicable to an application to be accessed by said UE, said received application rule being different from existing Policy Charging and Control, PCC, rules and having higher precedence than existing per session PCC rules;

storing, by said UDR, said received application rule;

receiving, by said UDR, from said PCF, a request for said application rule applicable to said user session, said request identifying an application to be accessed by said UE, and transmitting, by said UDR, to said PCF, said requested application rule stored in said UDR.

4. A Session Management Function, SMF, in a Service Based Architecture, SBA, domain in a core network of a telecommunications system, said SBA at least comprising an Application Function, AF, a User Plane Function and a Policy Control Function, PCF, said SMF being arranged to support implementation of an application rule for an application to be accessed by a User Equipment, UE, in a user session in said SBA domain, said SMF comprising:

- receive equipment, arranged for receiving an instruction from said PCF, instructing to execute a desired application rule to all present and future user sessions pertaining to said application, said desired application rule being different from existing Policy Charging and Control, PCC, rules and having higher precedence than existing per session PCC rules;
- identification equipment, arranged for identifying user sessions pertaining to said application to which said desired application rule is applicable, and
- implement equipment, arranged for implementing said desired application rule to said identified user sessions pertaining to said application.

5. The SMF according to claim 4, wherein said instruction comprises an AF Identifier, AF-ID an Application Identifier, App-ID, and at least one service requirement for processing said application in said SBA domain, wherein said identified user sessions are identified on the basis of said AF-ID and said App-ID.

6. A Unified Data Repository, UDR, in a Service Based Architecture, SBA, domain in a core network of a telecommunications system, said SBA comprising a Policy Control Function, PCF, an Application Function, AF and a Session Management Function, SMF, said UDR being arranged to support implementation of an application rule for an application to be accessed by a User Equipment, UE, in a user session in said SBA domain, said UDR comprising:

- receive equipment, arranged for receiving, from said PCF, said application rule applicable to said application to be accessed by said UE, said application rule being different from existing Policy Charging and Control, PCC, rules and having higher precedence than existing per session PCC rules;
- storage equipment, arranged for storing, said received application rule;
- said receive equipment being further arranged for receiving, from said PCF, a request for an application rule applicable to a user session, said request identifying an application to be accessed by said UE, and
- transmit equipment arranged for transmitting, to said PCF, said requested application rule stored in said storage equipment of said UDR.

\* \* \* \* \*

UNITED STATES PATENT AND TRADEMARK OFFICE
CERTIFICATE OF CORRECTION

| | | |
|---|---|---|
| PATENT NO. | : 12,284,311 B2 | Page 1 of 1 |
| APPLICATION NO. | : 18/321868 | |
| DATED | : April 22, 2025 | |
| INVENTOR(S) | : Muñoz De La Torre Alonso et al. | |

It is certified that error appears in the above-identified patent and that said Letters Patent is hereby corrected as shown below:

In the Specification

In Column 1, Line 10, delete "2021," and insert -- 2021, now U.S. Pat. No. 11,711,471, --, therefor.

In the Claims

In Column 12, Lines 55-56, in Claim 3, delete "an application rule" and insert -- the application rule --, therefor.

In Column 14, Line 19, in Claim 6, delete "an application rule" and insert -- the application rule --, therefor.

Signed and Sealed this
Twenty-first Day of October, 2025

John A. Squires
*Director of the United States Patent and Trademark Office*